July 11, 1961 J. MÜLLER 2,992,014
CONTROL ARRANGEMENT FOR INDEPENDENT WHEEL SUSPENSIONS
Filed Feb. 8, 1957 3 Sheets-Sheet 1

INVENTOR
JOSEF MÜLLER

BY Dicke and Craig.

ATTORNEYS

July 11, 1961 J. MÜLLER 2,992,014
CONTROL ARRANGEMENT FOR INDEPENDENT WHEEL SUSPENSIONS
Filed Feb. 8, 1957 3 Sheets-Sheet 2

INVENTOR
JOSEF MÜLLER
BY Dicke and Craig.
ATTORNEYS

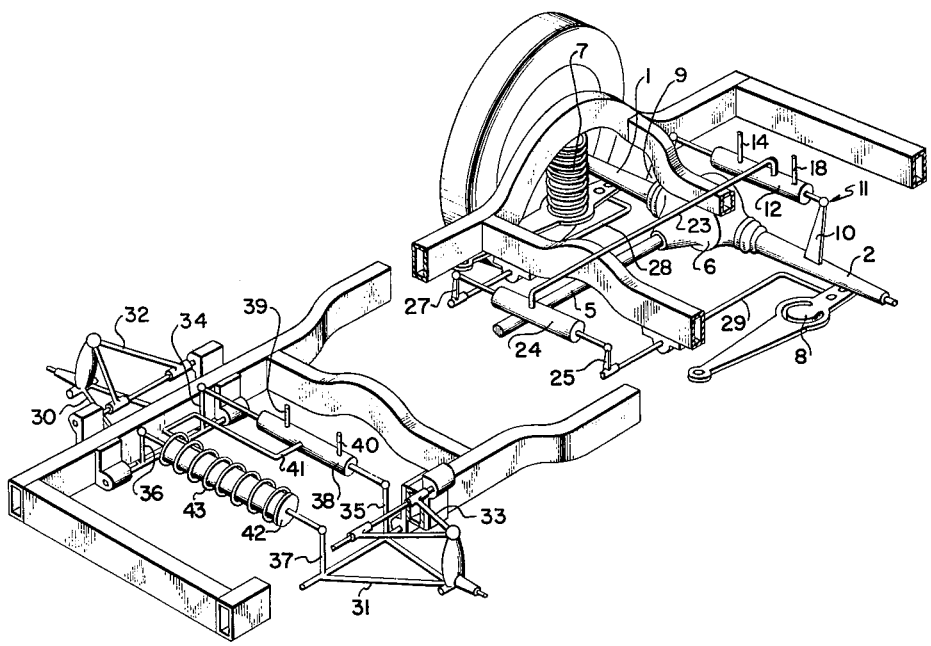

൭nited States Patent Office 2,992,014
Patented July 11, 1961

2,992,014
CONTROL ARRANGEMENT FOR INDEPENDENT WHEEL SUSPENSIONS
Josef Müller, Stuttgart-Riedenberg, Germany, assignor to Daimler-Benz Aktiengesellschaft, Stuttgart-Unterturkheim, Germany
Filed Feb. 8, 1957, Ser. No. 639,168
Claims priority, application Germany Feb. 10, 1956
10 Claims. (Cl. 280—124)

The present invention relates to independent wheel suspensions provided with adjustable spring systems to maintain the vehicle body in a predetermined position relative to the road, and more particularly to the arrangement of the control valves for a pressure medium in a system automatically adjusting the height or horizontal position of vehicle bodies in motor vehicles provided with mutually independent parts of independent wheel suspensions, such as, for example, swinging rear axles or swinging half axles for the rear wheels, single-joint swinging rear axles, transversely extending front axle guide members for steerable wheels or the like.

The control valves in automatic installations for purposes of adjusting the height of vehicle bodies in motor vehicles are ordinarily arranged independently of and without regard to the type of the spring system in such a manner that for each wheel a valve is provided or, with rigid axles, one valve is provided in the center of the rigid axle whereby any changes in the distance between the axle and the frame or between the spring and the frame are used as the measure for the height adjustment. If in independent wheel suspensions the control valves were provided only at one axle half, then such an arrangement would entail the disadvantage that especially with long, stretched-out curves of the road, a very undesirable adjustment in height or inclination of the vehicle body would take place. The arrangement according to the present invention offers the saving of one control valve per vehicle axle as compared to the known prior art arrangements. Additionally, undesirable adjustments in height or inclinations of the vehicle body are avoided.

According to a further feature of the present invention, the control valve may be arranged between levers which are rigidly connected to the independent wheel suspension parts.

According to still another feature of the present invention, the control valve may be arranged at one independent wheel suspension part and the linkage actuating the control valve at the other independent wheel suspension part.

Accordingly, it is an object of the present invention to provide an arrangement for the control of automatic height or level adjustment systems in connection with independent wheel suspensions which avoid the disadvantages of the prior art.

Another object of the present invention resides in the provision and particularly favorable arrangement of control valves for adjusting the height or leveling systems or for adjusting the auxiliary spring systems producing such adjustments which are provided in addition to the main spring system of the independent wheel suspensions.

A further object of the present invention resides in the provision of a control arrangement for systems adjusting the height or inclination of the body of motor vehicles which excels by simplicity in construction as well as savings in cost of manufacture and installation due to a decrease in the number of necessary parts for such systems and the resultant savings in labor during assembly obtainable thereby.

Still another object of the present invention is the provision of a control arrangement for systems of adjusting the height or inclination of the vehicle body, particularly in connection with independent wheel suspensions, which, notwithstanding its simplicity, completely avoids any undesirable adjustments in the height or inclination in the vehicle body.

A still further object of the present invention is an arrangement which makes it possible to use only one control valve per vehicle axle even though the wheels of each axle are independently suspended.

These and other objects, features, and advantages of the present invention will become more obvious from the following description when taken in connection with the accompanying drawing which shows, for purposes of illustration only, several embodiments in accordance with the present invention and wherein:

FIGURE 5 illustrates a vehicle having front and rear suspensions according to FIGURES 3 and 1, respectively.

The present invention consists essentially in that for each vehicle axle only one control valve is arranged between the two independent wheel suspension parts of the independent wheel suspensions associated with a vehicle axle, i.e., between two independent wheel suspension parts belonging to a pair of oppositely disposed vehicle wheels.

Figure 1:
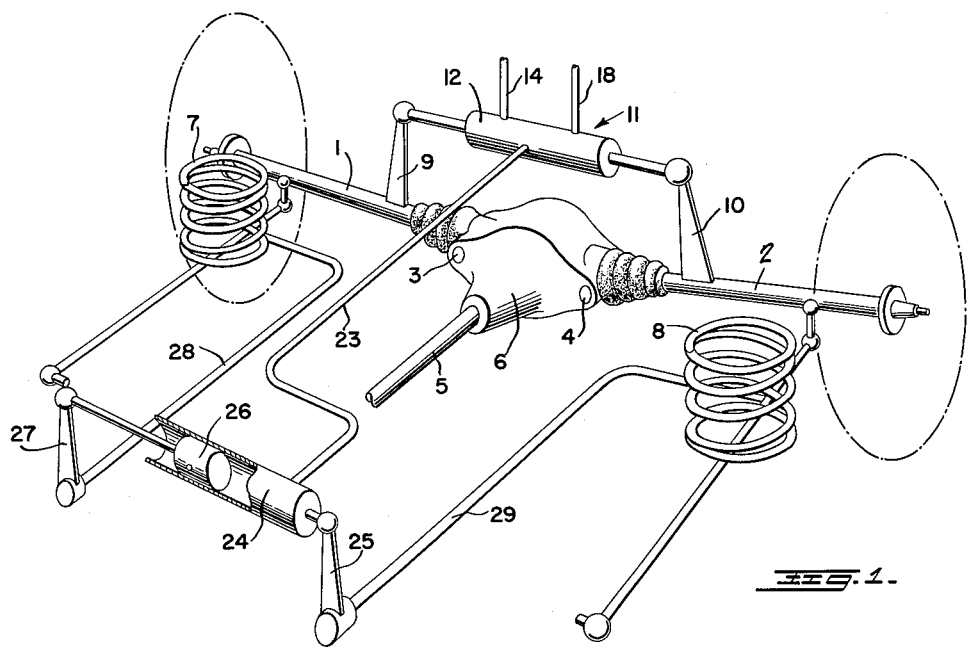
FIGURE 1 is a perspective view of a rear axle suspension of the swinging half axle type with an installation for automatically adjusting the height of the vehicle body in accordance with the present invention.
Figure 2:
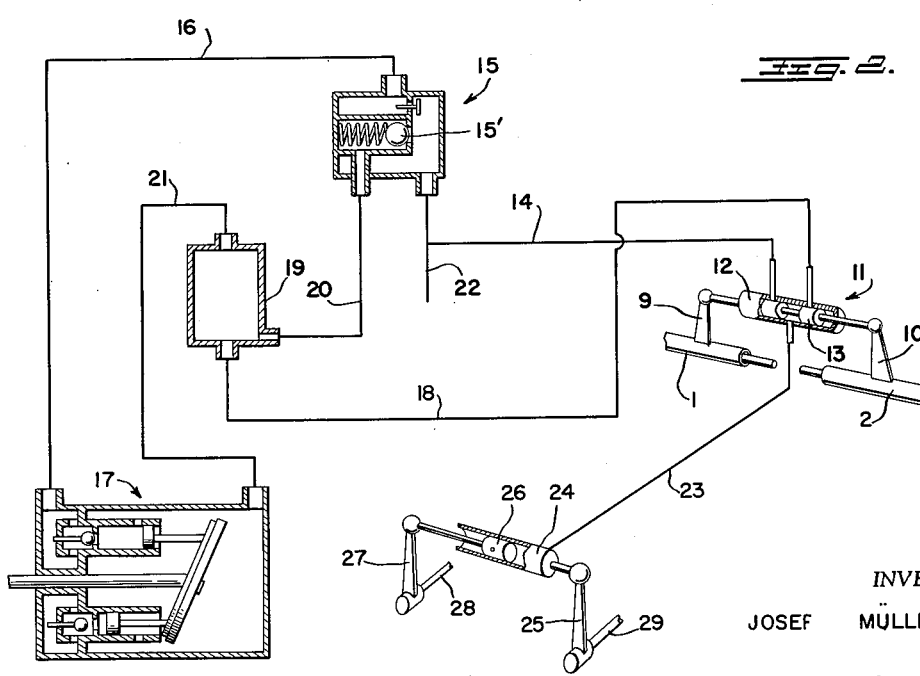
FIGURE 2 is a perspective schematic view of the control arrangement for the system according to FIGURE 1.

Referring now to the drawing, wherein like reference numerals are used throughout the various views to designate like parts, and more particularly to FIGURES 1 and 2 thereof, reference numerals 1 and 2 designate the swinging half axles of a wheel suspension constituting an independent wheel suspension for the rear wheels of the vehicle indicated in dotted lines. The swinging half axles 1 and 2 rotate against the effect of coil springs 7 and 8 about the axes formed by the trunnions 3 and 4, respectively, located in the rear axle gear housing 6. The usual drive shaft 5 leads into the rear axle gear casing 6. Levers 9 and 10 are rigidly connected with the swinging half axles 1 and 2. The control valve generally designated by reference numeral 11 is rigidly mounted at the levers 9 and 10 between the independent wheel suspension parts of the rear axle arrangement of FIGURE 1.

As will appear more clearly from FIGURE 2, the control valve generally designated by reference numeral 11 consists of a control valve cylinder 12 articulately connected in any suitable manner with the lever 9 and of a control piston 13 of the double spool type which is slidingly arranged in the control valve cylinder 12 and is articulately connected in any suitable manner with the lever 10. The control valve cylinder 12 is connected with a pressure reservoir 15 through a supply line 14. The pressure reservoir 15 is supplied with pressure oil over a line 16 by a pressure pump 17 of any suitable type, for example, by an axial piston type pump having a swash plate and driven in any suitable manner, for instance, from the engine (not illustrated). Of course, the pressure pump 17 may be of any suitable type other than that illustrated herein and may be driven in any suitable manner, for example, by an electric motor or the like.

A discharge line 18 leads from the control valve cylinder 12 to a supply reservoir 19 which in turn is connected, on the one hand, by line 20 with the relief valve or excess pressure valve 15' of the pressure reservoir 15 and, on the other hand, by line 21 with the pressure pump 17. The line 22 branching off the supply line 14 supplies a further control valve (not shown) which corresponds to the control valve 11 and which controls the independent wheel suspension for the front axle arrangement of the vehicle.

A line 23 terminating in the control valve cylinder 12 intermediate the lines 14 and 18 is connected with the displacing or adjustment cylinder 24 which, in turn, is articulately connected in any suitable manner with the lever 25. The piston 26 sliding within the cylinder 24, in turn, is articulately connected in any suitable manner with the lever 27. The levers 25 and 27 are secured to the ends of the torsion rod springs 28 and 29 which form an auxiliary spring system supplemental to the main spring system formed by coil springs 7 and 8 and which may be effectively added to the main spring system of the vehicle as will appear more fully hereinafter.

In operation, movements of the swinging half axles 1 and 2 and therewith of levers 9 and 10 are transmitted to the control valve 11 where such movements result in relative movements between cylinder 12 and piston 13 and thereby produce either a supply of pressure oil over the lines 14 and 23 into the adjustment cylinder 24 when levers 9 and 10 move toward each other or a discharge of pressure oil from the cylinder 24 over line 23, control valve 11 and discharge line 18 when the levers 9 and 10 move away from one another. In the former case, supply of pressure oil to cylinder 24 seeks to simultaneously rotate levers 25 and 27 away from each other and thereby brings about the effective addition or cut in of the auxiliary spring system formed by torsion rod springs 28 and 29 which are thereby subjected to greater torsional stresses, whereas, in the latter case the levers 25 and 27 are permitted to rotate toward each other as pressure oil flows off from cylinder 24 thereby effectively lessening or cutting out the effect of the auxiliary spring system on the main spring system 7, 8 by reason of the resulting decrease in the torsional stresses in the torsion rods 28 and 29. A simultaneous change in the torsional stresses of the rods 28 and 29 is applied to the axles 1 and 2 to change the position of both sides of the vehicle body in the same general direction relative the road. The rapid swinging movements of swinging half axles 1 and 2, however, remain essentially uneffective in practice due to the throttling resistance in the control valve 11 itself. However, it is understood also that separate delay mechanisms may be provided which permit the control valve to become effective only if the spring movement of the independent wheel suspension parts continues for a predetermined time.

Figure 3:
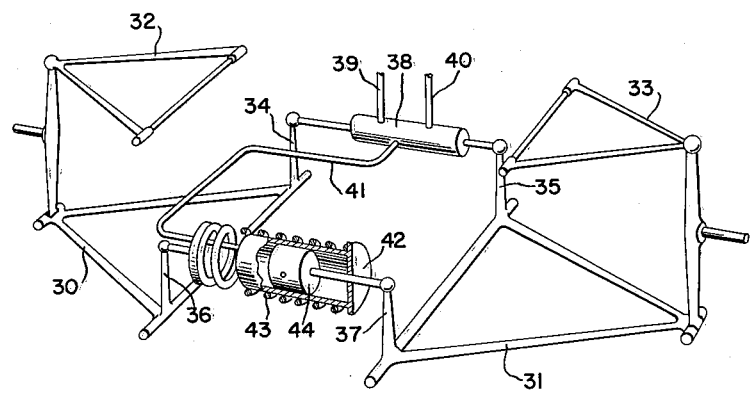
FIGURE 3 is a perspective view of a modified embodiment in accordance with the present invention for use with independent front axle suspensions of the transverse or cross guide arm type provided with installations for automatically adjusting the height of the vehicle body.

The independent wheel suspension parts of a front axle arrangement according to FIGURE 3 consists in addition to the usual springs, for example, of coil springs (not illustrated herein), of lower transverse or cross guide arms 30 and 31 and transverse or cross upper guide arms 32 and 33. Mutually opposite levers 34 and 35 as well as mutually opposite levers 36 and 37, respectively, are arranged in pairlike manner at the lower guide arms 30 and 31 whereby a control valve 38 which corresponds to the arrangement and which operates in a similar manner as that of FIGURES 1 and 2 is arranged between levers 34 and 35. The control valve 38 is connected with a supply line 39, a discharge line 40, and a connecting line 41 leading to the adjustment cylinder 42 articulately mounted between the levers 36 and 37. The adjustment cylinder 42 supports itself at the free end of an auxiliary or additional spring 43 which in turn abuts at the other end thereof against the lever 36. The piston rod of the piston 44 slidingly arranged within the adjusting cylinder 42 is connected in any suitable manner with the lever 37. A movement of the levers 34 and 35 toward each other actuates valve 38 to supply pressure medium to cylinder 42 and produces the addition to the main spring system (not illustrated) of the increased force of auxiliary spring 43 over the adjustment cylinder 42, and thereby the levers 36 and 37 are simultaneously moved outwardly along with a downward movement of the lower guide arms 30 and 31 to raise both sides of the vehicle body in the same general direction relative the road.

FIGURE 5 illustrates a vehicle frame using a front suspension according to FIGURE 3 in combination with the rear suspension of FIGURE 1. These suspensions are constructed and operate as discussed above, and for a detailed description thereof, see the discussion of FIGURES 1 and 3 above.

Figure 4:
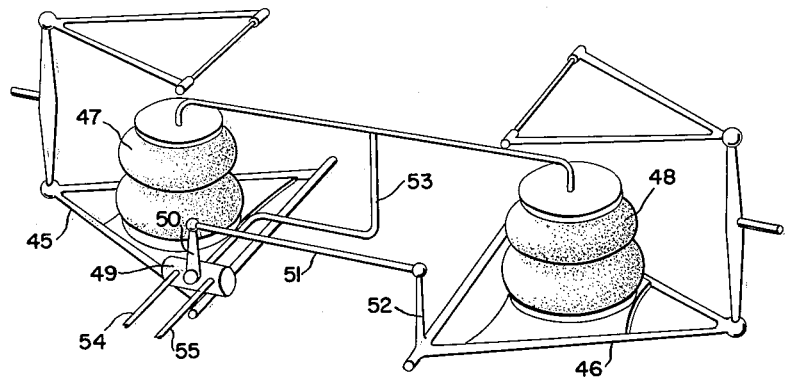
FIGURE 4 is a still further modified embodiment in accordance with the present invention for use with independent front axle suspensions of the transverse or cross guide arm type provided with a pneumatic spring system and an arrangement of the equalization valve therefor.

In the embodiment according to FIGURE 4, an independent front wheel suspension is also illustrated having independent wheel suspension parts. The two lower transverse or cross guide arms 45 and 46 are spring-suspended with respect to the vehicle body by means of pneumatic bellows 47 and 48. A control valve 49 is rigidly secured at the transverse guide arm 45 whereas a lever 50 actuating the control valve 49 is connected over a link rod 51 with the lever 52 rigidly connected with the lower transverse guide arm 46. An air line 53 leads from the control valve 49 toward the air bellows 47 and 48. Air under pressure simultaneously supplied to or discharged from the bellows 47 and 48 in any suitable manner (not illustrated herein) over the supply line 54 or discharge line 55 and the control valve 49 and line 53, depending on whether the transverse guide arms or members 45 and 46 are raised or lowered, respectively, and both sides of the vehicle body are thus simultaneously moved in the same general direction relative the road.

While I have shown and described several embodiments in accordance with the present invention, it is understood that the same is not limited thereto but is susceptible of many changes and modifications within the spirit of the present invention, and I intend to cover all such changes and modifications as encompassed by the appended claims.

I claim:

1. In a motor vehicle with independent wheel suspensions for at least two mutually opposite wheels of each vehicle axle including two mutually independent wheel suspension parts, each part belonging to a respective one of said independent wheel suspensions, adjusting means including spring means for automatically and simultaneously adjusting the position of both sides of the vehicle body in the same general direction relative to the road comprising a source of pressure medium, and only one control valve for each vehicle axle for controlling the flow of said pressure medium to said adjusting means, each control valve being operatively arranged between the two wheel suspension parts of the two wheel suspensions belonging to the same vehicle axle one of said control valves including relatively movable parts, one of said parts being rigidly connected with one of said two suspension parts, and further comprising link means for actuating said control valve and operatively connected with the other of said two suspension parts.

2. In a motor vehicle the combination according to claim 1, wherein said spring means is a pneumatic spring.

3. In a motor vehicle the combination according to claim 1, wherein said pressure medium is a hydraulic pressure medium and wherein said spring means is an auxiliary spring system adapted to be cut in or cut out by said pressure medium.

4. In a motor vehicle the combination according to claim 1, wherein said spring means is formed by torsion rod springs adapted to be cut in or cut out by said adjusting means, 5. In a motor vehicle the combination according to claim 1, wherein said adjusting means includes a cylinder and a piston sliding therein, said piston being operatively connected with one of said two wheel suspension parts, and wherein said cylinder supports itself against one end of said spring means, the other end of said spring means abutting against the other wheel suspension part.

6. In a motor vehicle having independent wheel suspensions including two independent wheel suspension parts adapted to suspend thereon the respective vehicle wheels of each vehicle axle, a system for automatically adjusting said parts relative the vehicle body to simultaneously raise or lower the height of both sides of the vehicle body including only one control valve per vehicle axle for controlling the associated adjusting system, said control valve being operatively connected with said two wheel suspension parts, said control valve including relatively movable parts, one of said parts being rigidly connected with one of said two suspension parts, and further comprising link means for actuating said control valve and operatively connected with the other of said two suspension parts.

7. In a motor vehicle having independent wheel suspensions with two independent wheel suspension parts for each vehicle axle, each of said parts being adapted to guide thereon a respective vehicle wheel, adjusting means for automatically and simultaneously adjusting the position of both sides of the vehicle body in the same general direction relative to the road comprising only one control valve means per vehicle axle for controlling said adjusting means, and means operatively connecting said control valve means between said two wheel suspension parts so as to control said adjusting means by means of said control valve means in response to relative movement of said two suspension parts, said control valve means including a valve cylinder articulately connected with one of said two suspension parts and a piston slidably arranged in said cylinder and articulately connected with the other of said two suspension parts.

8. In a motor vehicle the combination according to claim 7, wherein said two independent suspension parts are constituted by two transversely extending guide members for the front wheels.

9. In a motor vehicle having front and rear wheel axles the combination according to claim 7, wherein the front wheel axle of the vehicle includes two cross guide members constituting one pair of said independent wheel suspension parts, and wherein the rear wheel axle of the vehicle includes two swinging half axles constituting another pair of said independent wheel suspension parts, a control valve means being operatively connected between the two parts of each said pair of two independent wheel suspension parts, and one of said adjusting means being operatively associated with each said pair of independent wheel suspension parts and being controlled by a respective one of said valve means.

10. In a motor vehicle having independent wheel suspensions with two independent wheel suspension parts for each vehicle axle, each of said parts being adapted to guide thereon a respective vehicle wheel, adjusting means for automatically and simultaneously adjusting the position of both sides of the vehicle body in the same general direction relative to the road comprising only one control valve means per vehicle axle for controlling said adjusting means, and means operatively connecting said control valve means between said two wheel suspension parts so as to control said adjusting means by means of said control valve means in response to relative movement of said two suspension parts, further comprising a lever each for each of said two suspension parts rigidly connected thereto, said valve means including a cylinder and a piston therein, and means connecting said cylinder and piston with respective ones of said levers.

References Cited in the file of this patent

UNITED STATES PATENTS

| 2,577,761 | Hickman | Dec. 11, 1951 |
| 2,787,474 | Brueder | Apr. 2, 1957 |
| 2,895,745 | Brueder | July 21, 1959 |

FOREIGN PATENTS

| 1,098,063 | France | Mar. 2, 1955 |